United States Patent [19]

Ohnishi et al.

[11] 4,303,895

[45] Dec. 1, 1981

[54] AUTOMATIC EQUALIZER

[75] Inventors: Shunichi Ohnishi, Yokohama; Masaharu Obara, Tokyo; Masaru Sakurai, Kawasaki; Hisashi Yamada, Yokohama, all of Japan

[73] Assignees: Nippon Hoso Kyokai, Tokyo; Tokyo Shibaura Denki Kabushiki Kaisha, Kawasaki, both of Japan

[21] Appl. No.: 158,311

[22] Filed: Jun. 10, 1980

[30] Foreign Application Priority Data

Feb. 14, 1979 [JP] Japan .................. 54-15646

[51] Int. Cl.$^3$ .............................. H04B 3/04
[52] U.S. Cl. ....................... 333/18; 358/905
[58] Field of Search .............. 333/18, 166; 358/167, 358/905; 375/12, 14

[56] References Cited

U.S. PATENT DOCUMENTS 3,479,458 11/1969 Lord et al. ............... 333/18 X
4,250,472 2/1981 Hashimoto .............. 333/18 X

FOREIGN PATENT DOCUMENTS 54-149549 11/1979 Japan .................... 333/18

OTHER PUBLICATIONS

Makino et al., *A Fully Automatic Ghost Canceller*, IEEE Trans. on Consumer Electronics, Aug. 1978, pp. 267–273.

Arnon, *An Adaptive Equalizer for Television Channels*, IEEE Trans. on Communication Tech., Dec. 1969, pp. 726–734.

*Primary Examiner*—Paul L. Gensler
*Attorney, Agent, or Firm*—Oblon, Fisher, Spivak, McClelland & Maier

[57] ABSTRACT

An automatic equalizer comprises a transversal filter for receiving an input signal to be equalized and having adjustable tap gains, a circuit connected to receive an output signal of the transversal filter and the input signal to be equalized to produce an equalized output signal, a distortion detect circuit for detecting a distortion component included in the output signal, a tap gain correct circuit connected to receive a distortion detect signal from the distortion detect circuit to produce tap gain correct signals, and a tap gain hold circuit responsive to the tap gain correct signals to correct the tap gains of the transversal filter and hold the corrected tap gains. In order to eliminate the influence of DC offset component at the output of the distortion detect circuit on the signal equalization, a polarity inverting circuit is provided for synchronously and periodically inverting the polarity of a signal component included in the output signal of the distortion detect circuit and the polarity of the tap gain correct signals.

6 Claims, 17 Drawing Figures

F I G. 3A
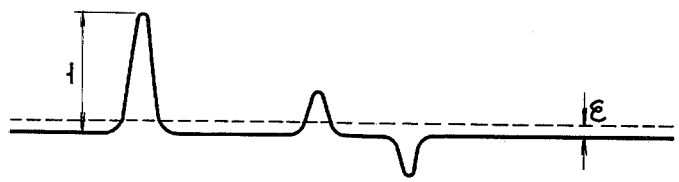
F I G. 3B
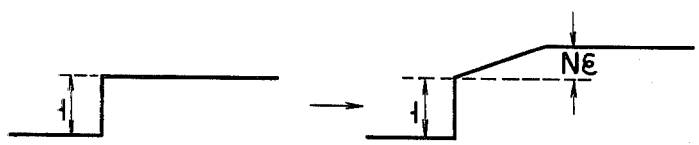
F I G. 4
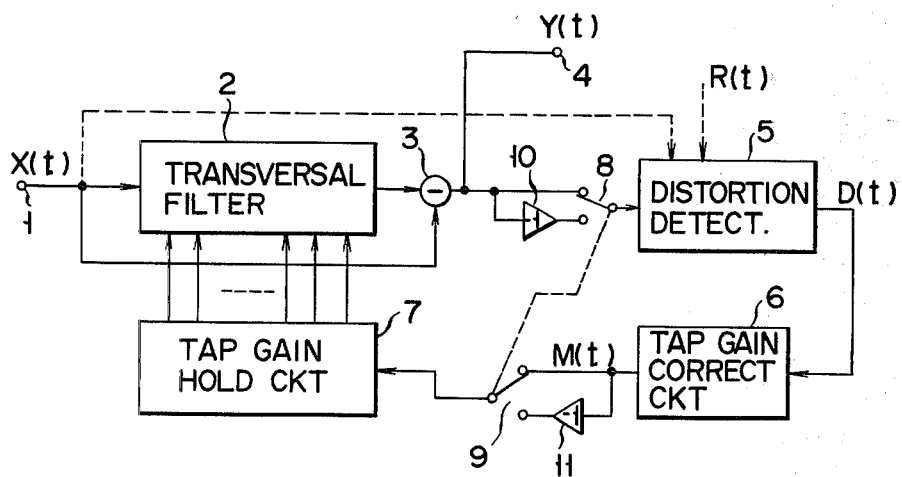

F I G. 5
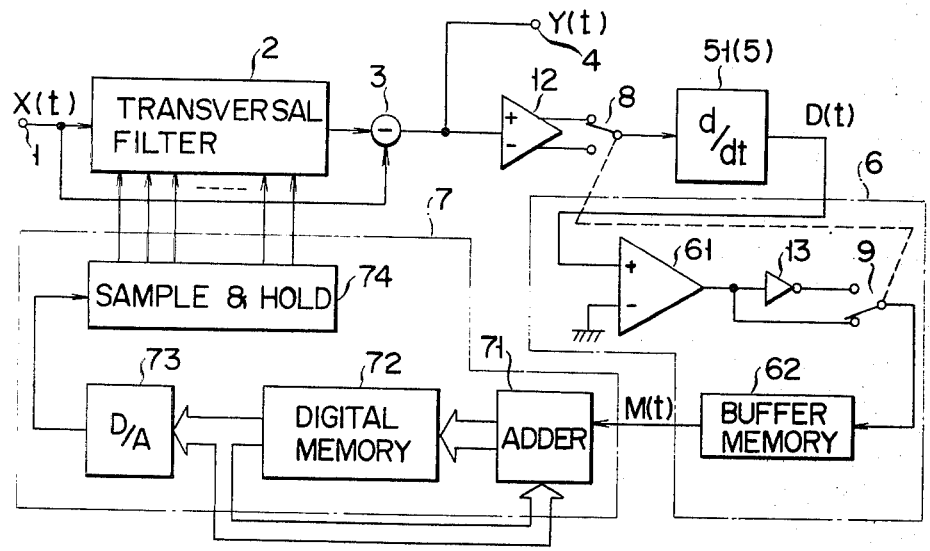
F I G. 6
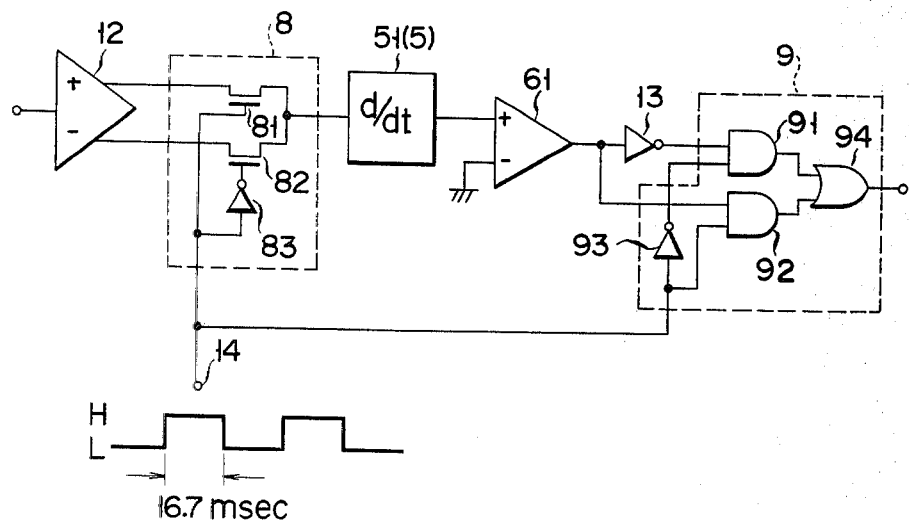

F I G. 7
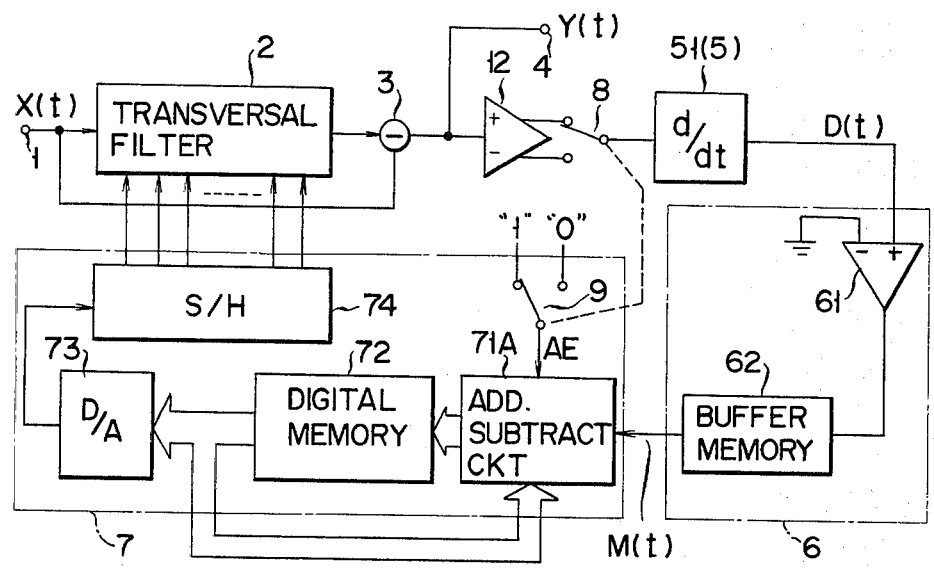
F I G. 8
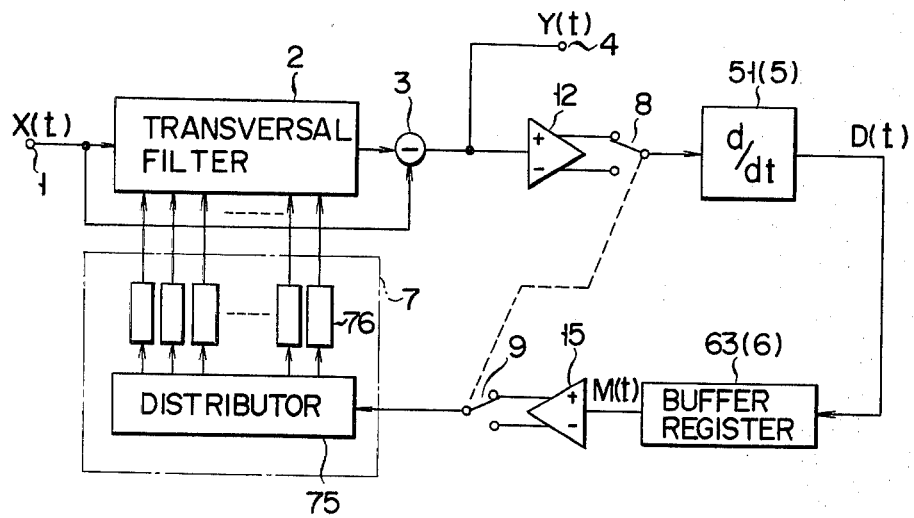

F I G. 13
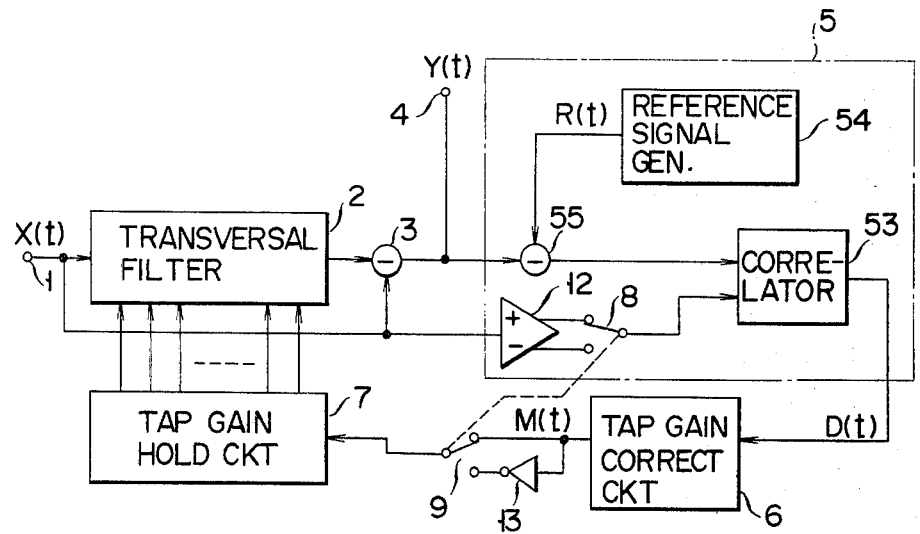
F I G. 14
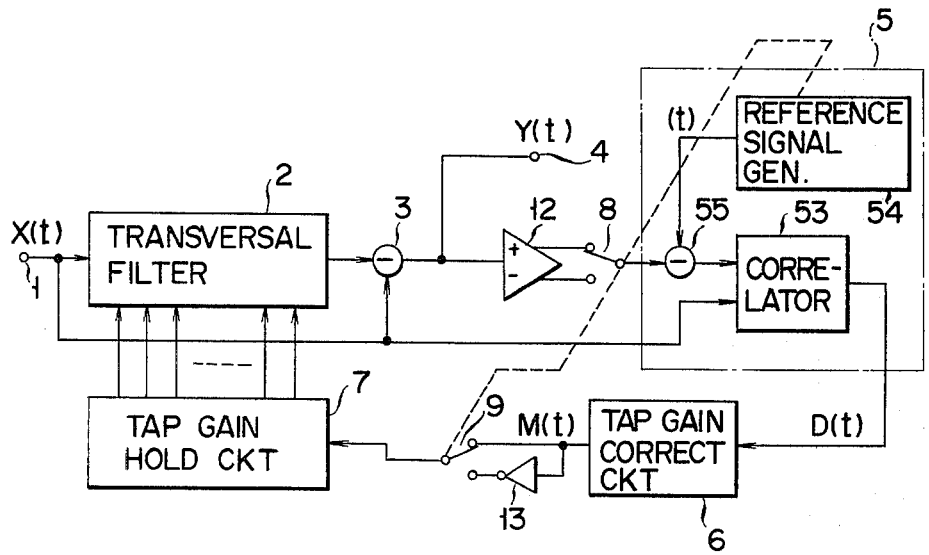

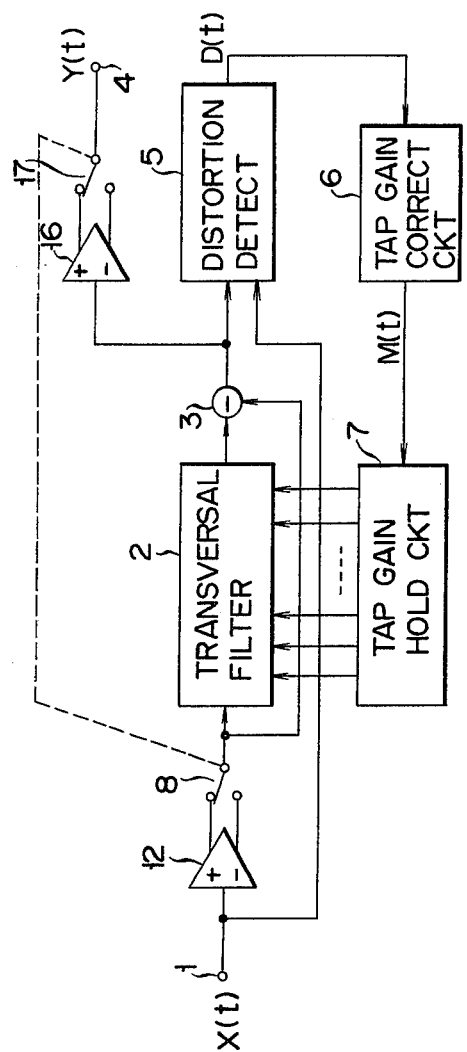
F I G. 15

AUTOMATIC EQUALIZER

BACKGROUND OF THE INVENTION

1. Field of the Invention

The present invention relates to an automatic equalizer which uses a transversal filter.

2. Description of the Prior Art

A device which eliminates distortion components in electric signals by controlling the tap gains of a transversal filter is called an automatic equalizer and is widely used as waveform equalizers and echo cancellers in signal transmission paths. Recently, an attempt is being made to use this automatic equalizer for eliminating ghost or multipath signals in television receivers.

FIG. 1 schematically shows an automatic equalizer which uses a transversal filter. From a terminal 1, an input signal X(t) to be equalized is supplied to a transversal filter 2. A subtracter 3 produces the difference between this input signal X(t) and the output signal of transversal filter 2. By appropriately controlling the tap gains of transversal filter 2, a signal from which distortion components are eliminated, that is, an equalized signal, is obtained at the output of subtracter 3. This output signal Y(t) is applied to a utilization circuit through a terminal 4. When the output signal of the transversal filter 2 is opposite in phase to the input signal X(t), the subtracter 3 may be replaced by an adder.

FIGS. 2A and 2B show practical examples of the transversal filter 2 which is comprised of a tapped-delay-line 21 which consists of an electric charge transfer device such as a CCD (charge coupled device), and weighting circuits 22. The transversal filter shown in FIG. 2A is of the type called an input-weighted transversal filter wherein an input signal is multiplied by weighting coefficients (tap gain) in weighting circuits 22 and the multiplied input signals are applied to corresponding taps of the tapped-delay-line 21. The transversal filter shown in FIG. 2B is of the type called an output-weighted transversal filter wherein an output signal at each tap of the tapped-delay-line is multiplied by a weighting coefficient (tap gain) in a corresponding weighting circuit 22 and the multiplied output signals are synthesized by an adder 23 into an output signal.

Referring again to FIG. 1, the tap gains of the transversal filter 2 are held by a tap gain hold circuit 7. These tap gains are automatically corrected in the following manner. Part of the equalized output signal Y(t) is supplied to a distortion detect circuit 5. The distortion detect circuit 5 detects distortion components which are associated with a reference signal included in the output signal Y(t) or a signal obtained by differentiating the signal Y(t) (vertical synchronizing signals included in video signals in the case of eliminating ghosts). As another example, the distortion detect circuit 5 detects the distortion components in the output signal Y(t) by correlating the input signal X(t) to the output signal Y(t) or the input signal X(t) to a difference between the output signal Y(t) and a reference signal R(t). A detection signal D(t) derived from the distortion ciruit 5 is supplied to a tap gain correct circuit 6. The tap gain correct circuit 6 corrects the tap gain held by the tap gain holding circuit 7 in response to the detect signal D(t). Namely, the circuit 5 periodically judges the polarity of the detect signal D(t) to produce correct signals M(t) which are applied to the tap gain hold circuit 7. The tap gain hold circuit 7 has, for example, a digital memory for storing tap gain information, and the information stored therein is corrected by the correct signals M(t). An output signal of this memory is D/A converted and is supplied to a corresponding weighting circuit 22 of the transversal filter 2 for correcting the corresponding tap gain.

One of the problems with such an automatic equalizer as described above is an influence due to a direct current (DC) offset component which appears at the outputs of the distortion detect circuit 5 and the tap gain correct circuit 6. For example, when there is an echo (ghost) signal as a distortion component, the detect signal D(t) may have such a waveform as shown in FIG. 3A. In the figure $\epsilon$ represents the DC offset component. Such a DC offset component $\epsilon$ is regarded as distortion to be eliminated in the system of FIG. 1. Therefore, $-\epsilon$ is superposed on every tap gain. Consequently, the input signal or the output signal at each tap of the transversal filter 2 is multiplied by $-\epsilon$. As a result, a sag of value N $\epsilon$ is generated in the output signal Y(t), as shown in FIG. 3B, for a rectangular wave input signal. N is the number of taps of the transversal filter 2. Since the delay time of the tapped-delay-line 21 is required to be 20-30 $\mu$sec in the case of a television ghost eliminating device, N becomes 200-300. In such a case, for reducing the sag value N $\epsilon$ to $-40$ dB, the DC offset component $\epsilon$ must be reduced below $-90$ dB. However, it it extremely difficult to reduce the DC offset to such a value. Consequently, waveform distortions such as the generation of sag has been unavoidable in the output signal Y(t).

SUMMARY OF THE INVENTION

An object of the present invention, therefore, is to provide an automatic equalizer which is so arranged as to effectively eliminate an influence imposed on the equalization of signal due to a DC offset at the output of a distortion detect circuit.

According to this invention, the above object is attained by provision of a polarity inverting means which synchronously and periodically inverts the polarity of a distortion detect signal which is to appear at the output terminal of the distortion detect circuit and the polarity of tap gain correct signals.

With this arrangement, the DC offset component generated at the output of the distortion detect circuit is coupled to the tap gain hold circuit while its polarity is being periodically changed, and on the other hand, distortion signal components are applied to the tap gain hold circuit with the polarity unchanged because the distortion detect signal and the correct signal are polarity-inverted. The DC offset component whose polarity is periodically inverted can be cancelled out by the integrating operation of the tap gain hold circuit.

BRIEF DESCRIPTION OF THE DRAWINGS

This invention can be more fully understood from the following detailed description when taken in conjunction with the accompanying drawings, in which:

FIGS. 3A and 3B show waveforms for explaining a drawback of the automatic equalizer shown in FIG. 1;

FIG. 4 shows the basic construction of an automatic equalizer in accordance with the present invention;

FIG. 5 shows an embodiment of the automatic equalizer in accordance with the present invention;

FIG. 6 is a circuit diagram of the main part of the device shown in FIG. 5; and

FIGS. 7 to 15 show other embodiments of the automatic equalizer in accordance with the present invention.

Figure 1:
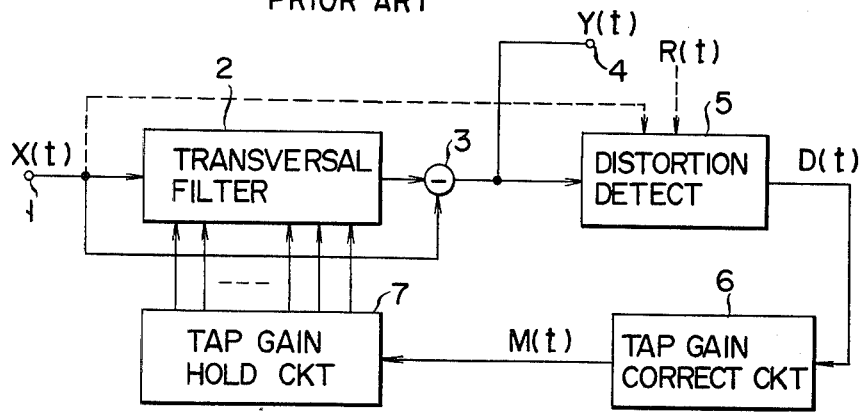
FIG. 1 shows a prior art automatic equalizer which uses a conventional transversal filter.
Figure 2A:
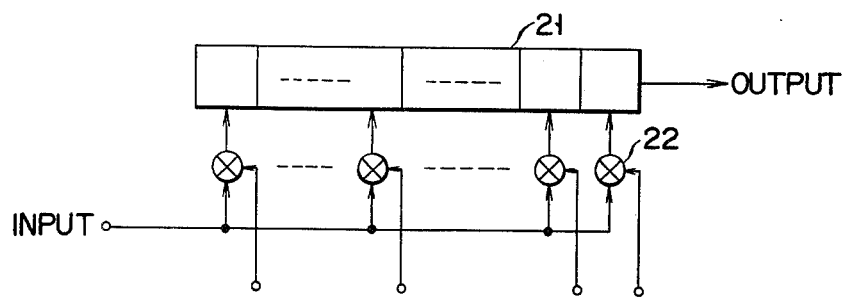
FIGS. 2A and 2B schematically show a conventional input-weighted transversal filter and a conventional output-weighted transversal filter, respectively.
Figure 2B:
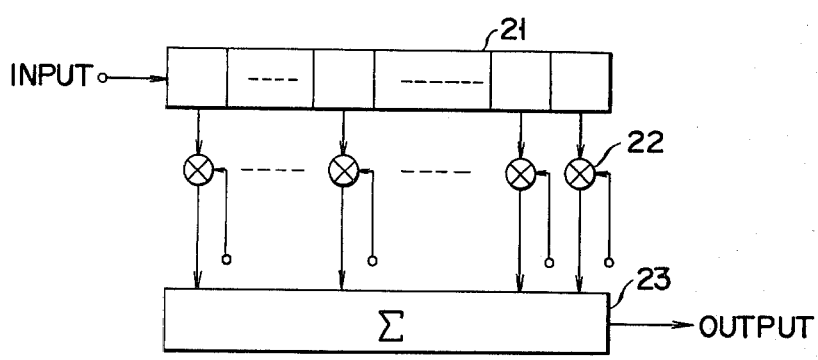

The present invention will now be described hereinafter. Correction of the tap gains in an automatic equalizer which uses a transversal filter is accomplished by integrating correct signals M(t) in a digital or analog manner. When the correct signal M(t) represents the sign of the detect signal D(t) alone, the incremental control is effected, and when it is in proportion to the amplitude of the detect signal D(t), the proportional control is effected.

As was already described, if the distortion detect circuit 5 detects the distortion component by correlating the input signal X(t) with a difference between the output signal Y(t) and a reference signal R(t), the detecting signal D(t) may be obtained as follows:

$$D(t) = \int X(\tau)\{Y(t+\tau) - R(t+\tau)\}d\tau \quad (1)$$

Based on the detect signal D(t), the correct signal M(t) may be obtained as follows:

$$M(t) = -\alpha_{sgn}\{D(t)\} \quad (2)$$

or $$M(t) = -\beta D(t) \quad (3)$$

Equation (2) represents a correct signal in the incremental control, and equation (3) represents a correct signal in the proportional control where $\alpha_{sgn}\{D(t)\}$ denotes a function of the signal of D(t) which represents $\pm 1$ and $\alpha$ and $\beta$ are positive constants.

The Kth sampled value $M_K$ of M(t) is added to the Kth tap gain $C_K$ of the transversal filter 2 every time the reference signal appears. That is, the operation $$C_K^{n+1} = C_K^n + M_K \quad (4)$$

is repeated to convergence, where n denotes the number of correction times of tape gains.

The DC offset component at the output of the distortion detect circuit 5 is added to the detect signal D(t). When the polarity of the signal component represented by equation (1) and included in the detect signal D(t) is inverted, the polarity of the correct signal M(t) is inverted in synchronism therewith. Accordingly, the polarity of the signal component in M(t) remains unchanged and only the polarity of the DC offset component is inverted. Therefore, if the polarity inversion is repeated in this manner, the DC offset component is equivalently eliminated by the addition or integration operation of a tap gain control voltage in the tap gain hold circuit. The DC offset component produced by the tap gain correct circuit may be cancelled out in the hold circuit by the periodical polarity inversion of the correct signal.

FIG. 4 illustrates the basic construction of an equalizer based on this principle of the present invention. The polarity of the signal component in the detect signal D(t) is equivalently inverted by inverting, for example, the polarity of the equalized output signal Y(t) among input signals to the distortion detect circuit 5 by a first switch 8, and the polarity of the correct signal M(t) is inverted by a second switch 9 which is ganged with the first switch 8. Numerals 10 and 11 denote inverters for providing inverted signals of Y(t) and M(t), respectively.

FIG. 5 shows a practical arrangement of an embodiment of the present invention. The distortion detect circuit 5 comprises a differentiator 51 for differentiating the reference signal in the output signal Y(t), for example, the vertical synchronizing signal when the input signal X(t) is a television signal. The detect signal D(t) produced by the differentiator 51 is applied to the tap gain correct circuit 6. The tap gain correct circuit 6 is comprised of a voltage comparator 61 which detects the polarity of the detect signal D(t). The output signal of voltage comparator 61 is sampled by a buffer memory 62, and then applied to the tap gain hold circuit 7 as the tap gain correct signals M(t). The tap gain hold circuit 7 comprises an adder 71, a digital memory 72 for storing the tap gains as digital data, a D/A converter 73 for converting data read out of the memory 72 into an analog voltage, and a sample and hold circuit 74 for supplying the analog voltage to the transversal filter 2 as a weighting control voltage. The data stored in the memory 72 is corrected by the adder 71 by adding the tap gain correct signal M(t) to the previous data from the memory.

The above construction corresponds to a case wherein an impulse signal $\Delta(t+\tau)$ and $\Delta(\tau)$ are used respectively for $R(t+\tau)$ and $X(\tau)$ in equation (1), the correct signal M(t) is represented by equation (2), and incremental control is performed.

Further, in this embodiment, the polarity of the detect signal D(t) is periodically inverted by placing in front of the differentiator 51 an amplifier 12 for producing same-phase and opposite-phase signals of the output signal Y(t) and the first switch 8 for periodically alternately selecting the same-phase and the opposite-phase signal. The polarity of the correct signal M(t) is periodically inverted by placing at the output side of the voltage comparator 61 an inverter 13 and the second switch 9 for periodically alternately selecting the output signals of the inverter 13 and the comparator 61. In this manner, the positive DC offset component and the negative DC offset component are alternately supplied to the adder circuit 71, and the Dc offset component is thus eliminated by digital integration i.e. addition in the adder 71.

The practical arrangements of the switches 8 and 9 are shown in FIG. 6. To a terminal 14 is applied a switching pulse whose voltage level is inverted for every vertical synchronizing signal period (16.7 msec). When the switching pulse is at the high level, an analog gate 81 in the first switch 8 is conductive and the same-phase output signal of the amplifier 12 is applied to the differentiator 51. In the second switch 9, since an AND gate 92 is enabled, the output of the comparator 61 is taken in the same phase through the AND gate 92 and an OR gate 94. When the switching pulse is at the low level, in the first switch 8, an analog gate 82 is rendered conductive by an inverter 83 and the opposite-phase output signal of the amplifier 12 is obtained. In the second switch 9, since an AND gate 91 is enabled by the output of an inverter 93, the output signal of the comparator 61 is taken in the opposite phase through the inverter 13, the AND gate 91 and the OR gate 94. In FIG. 5, the amplifier 12 and the first switch 8 may be disposed at the output side of the differentiator 51 and the inverter 13 and the second switch 9 may be disposed at the output side of the buffer memory 62.

The inversion of polarity of the correct signal M(t) may be accomplished equivalently as shown in FIG. 7. Referring to FIG. 7, the output of the voltage comparator 61 is directly applied to the buffer memory 62, and an add-subtract circuit 71A is employed. The add-subtract circuit 71A is supplied with a control signal AE of a logic 1 level or a logic 0 level by the switch 9 ganged with the switch 8. When the control signal AE of the logic 1 level is supplied as shown in the figure, the add-subtract circuit 71A operates as an adder; and when the control signal AE of the logic 0 level is supplied, it operates as a subtracter.

Figure 9:
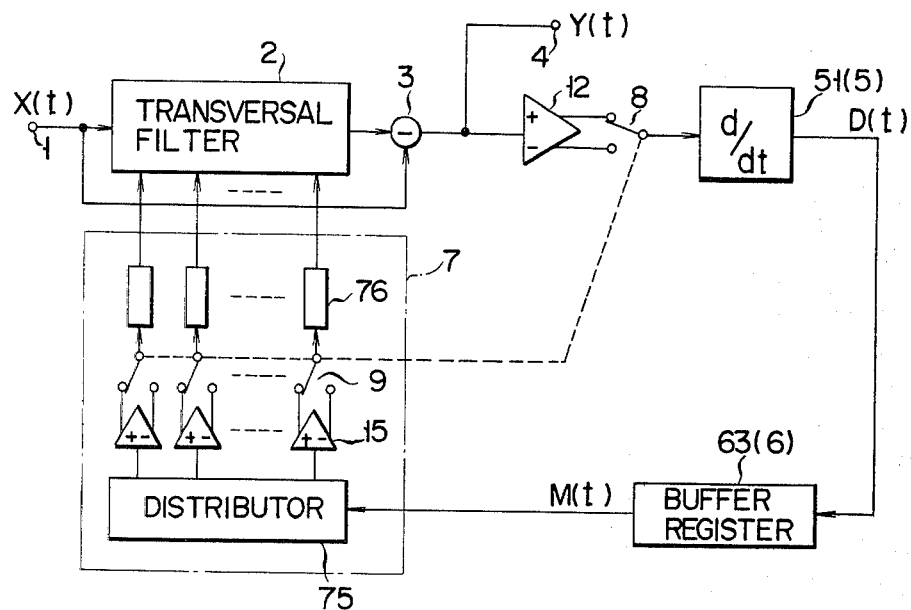

Other embodiments of the present invention are shown in FIGS. 8 to 15. Specifically, FIGS. 8 and 9 illustrate proportional control type automatic equalizers. In the embodiments the tap gain correcting circuit 6 is comprised of an analog buffer register 63 to which is applied the detect signal D(t) from the differentiator 51 or the distortion detecting circuit 5. The tap gain hold circuit 7 comprises a distributor 75 and tap gain memories 76. Each sampled value of the correcting signal M(t) sampled by the analog buffer register 63 is distributed to the tap gain memories 76 by the distributor 75. The tap gain memory 76 may be, for example, an analog integrator whose output voltage is applied to the transversal filter 2 as a weighting control voltage.

In the embodiments of FIGS. 8 and 9, the polarity inverting means for the detect signal D(t) is the same as in the case of FIG. 5. In the case of FIG. 8, the polarity inversion of the correct signals M(t) is accomplished by placing an amplifier 15 for obtaining same-phase and opposite-phase output signals and the second switch 9 at the output side of the buffer register 63 and by switching over the second switch 9 in synchronism with the first switch 8. In the case of FIG. 9, the polarity inversion of correct signals M(t) is accomplished by placing amplifiers 15 for producing same-phase and opposite-phase output signals and the second switches 9 between the distributor or analog register 75 and the tap gain memories 76. In both of the embodiments shown in FIGS. 8 and 9, the DC offset component is cancelled out since the positive Dc offset component and the negative DC offset component are alternately supplied to the analog intergrators 76.

Figure 10:
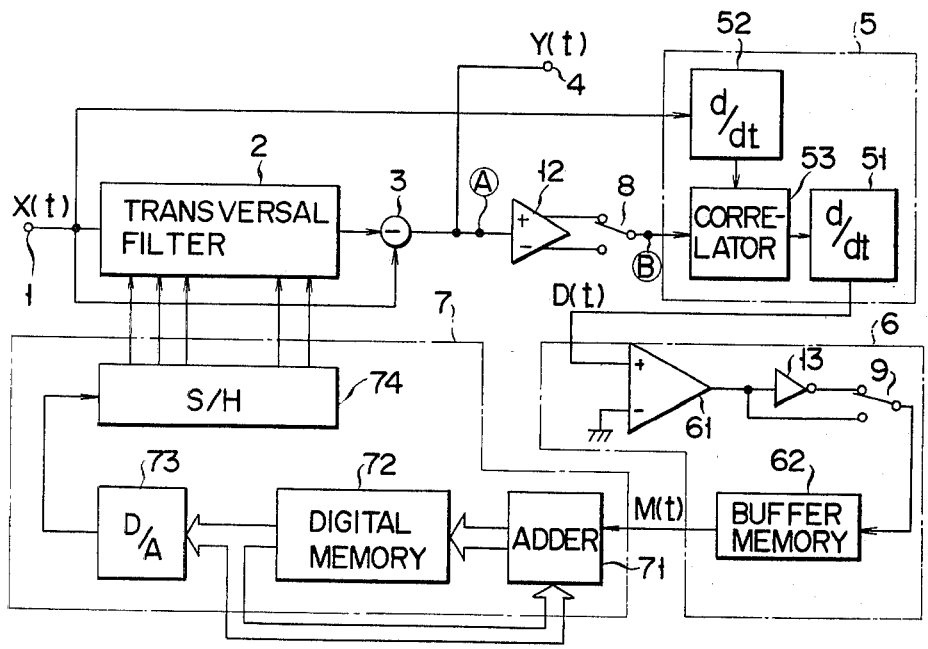
Figure 11:
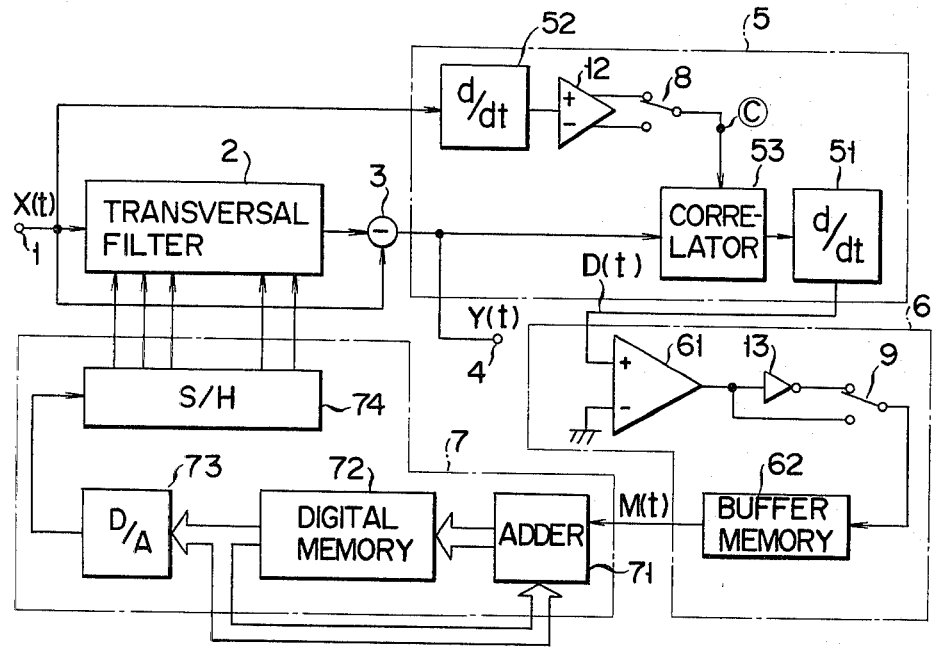

In the embodiments shown in FIGS. 10 and 11, a differentiator 52 for differentiating the input signal X(t) and a correlator 53 for correlating the output signal of the differentiator 52 with the output signal Y(t) are included in the distortion detect circuit 5 besides the differentiator 51. The output signal of the correlator 53 is differentiated by the differentiator 51 to produce the distortion detect signal D(t). The polarity inversion of the signal component included in the detect signal D(t) may be accomplished by inverting the polarity of one of the two input signals applied to the correlator 53. In the embodiment shown in FIG. 10, the amplifier 12 and the first switch 8 are disposed between the subtracter 3 and the correlator 53 for inverting the polarity of Y(t) to be applied to the correlator 53. On the other hand, in the embodiment shown in FIG. 11, the polarity of the output signal of the differentiator 52 is inverted by means of the amplifier 12 and switch 8. The polarity inversion of the correct signal M(t) may be accomplished in the same manner as shown in FIG. 5. The positions of the differentiators 51 and 52 are not limited to the positions shown in the figures; the differentiator 51 shown in FIG. 10 may be located either at point A or point B, and differentiator 52 shown in FIG. 11 may be located at point C.

Figure 12:
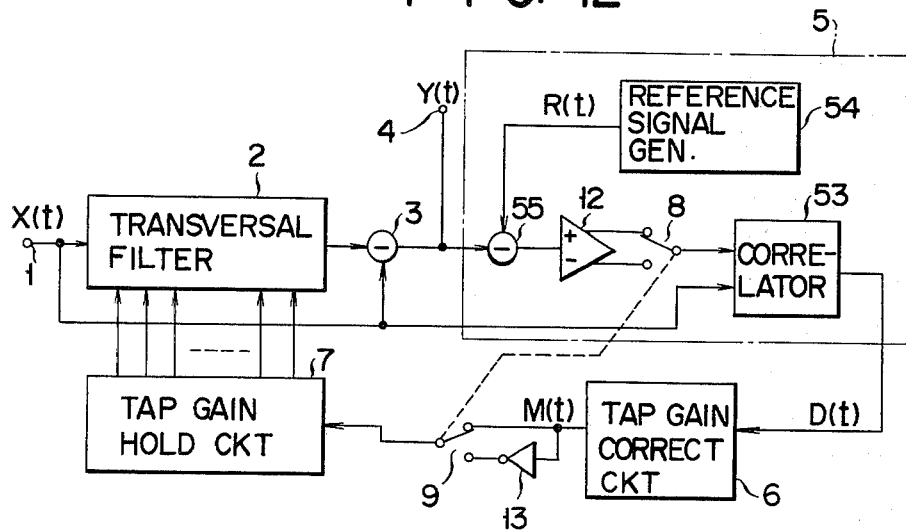

The above embodiments are directed to a television ghost eliminating device for eliminating ghost signal components, taking the vertical synchronizing signal as a distortion detect reference signal. FIGS. 12 to 14 show embodiments directed to a general automatic equalizer. The distortion detect circuit 5 in each embodiment comprises a reference signal generator 54, a subtracter 55 for producing a signal representative of the difference between the reference signal R(t) and the output signal Y(t), and the correlator 53 for correlating the output signal of the subtracter 55 with the input signal X(t). The polarity inversion of the signal component included in the detect signal D(t) is accomplished by inverting the polarity of the output signal of the subtracter 55 by means of the amplifier 12 and the switch 8 in the embodiment of FIG. 12, by inverting the polarity of the input signal X(t) supplied to the correlator 53 in the embodiment of FIG. 13, and by simultaneously inverting the polarity of output signal Y(t) and the polarity of the reference signal R(t) supplied to the subtracter 5 in the embodiment of FIG. 14.

In the embodiments shown in FIGS. 12 to 14, the tap gain correct circuit 6 and the tap gain hold circuit 7 may be constructed as in the embodiments previously described, and the polarity of the correct signal M(t) may be inverted in any manner previously described.

In the embodiment shown in FIG. 15, the polarity inversion of the detect signal D(t) is accomplished by inverting the polarity of the input signal X(t) to be applied to the transversal filter 2 by means of the amplifier 12 and the switch 8 disposed at the input side of the transversal filter 2. Further, if the reference signal R(t) is used in the distortion detect circuit 5, its polarity must be inverted in synchronism with the inversion of the polarity of X(t). In the embodiment of in FIG. 15, an amplifier 16 and a switch 17 connected between the subtracter 3 and output terminal 4 are not related to the control operation and are provided for making the polarity of the output signal Y(t) identical to the polarity of the input signal X(t).

According to this invention, as described above, the influence of the DC offset component contained in the detect signal is eliminated through the integrating action of the tap gain hold circuit by synchronously and periodically inverting the polarity of the detect signal produced by the distortion detect circuit and the polarity of the correct signals produced by the tap gain correct circuit responsive to detect signal. Therefore, in accordance with the present invention, since the tap gains of the transversal filter are not changed by the DC offset component, waveform distortion of the output signal caused by generation of sag is prevented, resulting in improved signal equalization. Further, since it is not required to make the Dc offset generated by the distortion detect circuit or the tap gain correct circuit extremely small, the design of these circuits, e.g., the differentiator, correlator, voltage comparator and so on, is extremely facilitated.

The present invention is effective to eliminate the influency caused by not only the DC offset produced by circuits but also equivalent DC offset due to clock noises.

The present invention is also applicable to a construction which includes an accumulator of data in front of the tap gain hold circuit. In this case, the polarity of the input signal to the accumulator is inverted in synchronism with the detect signal.

In the present invention, the same effects can also be obtained when the inverting frequency of the polarity of the detect signal is an integral multiple of the inverting frequency of the polarity of the tap gain correct signal and vice versa.

What we claim is:

1. An automatic equalizer comprising a transversal filter connected to receive an input signal to be equalized and having tap gains adjustable by control voltages supplied from outside; a circuit connected to receive an output signal from the transversal filter and the input signal to be equalized to produce an equalized output signal; a distortion detect circuit connected to receive the equalized output signal to detect a distortion component contained in the output signal and to produce a distortion detect signal in correspondence with the distortion component; a tap gain correct circuit responsive to the distortion detect circuit to produce tap gain correct signals; and a tap gain hold circuit responsive to the tap gain correct circuit to correct the control voltages supplied to the transversal filter based on the tap gain correct signals and hold the corrected control voltages;

characterized by further comprising polarity inverting means for synchronously and periodically inverting the polarity of a signal component included in the distortion detect signal produced at the output of the distortion detect circuit and the polarity of the correct signals.

2. An automatic equalizer as claimed in claim 1 wherein the distortion detect circuit includes a correlator for correlating the input signal to be equalized with the equalized output signal, and the polarity inverting means is so arranged as to invert the polarity of either the input signal to be equalized or the equalized output signal in order to invert the polarity of the signal component included in the distortion detect signal produced at the output of the distortion detect circuit.

3. An automatic equalizer as claimed in claim 1 wherein said distortion detect circuit includes a correlator for correlating the input signal to be equalized with a differential signal representing the difference between the equalized output signal and a reference signal, and said polarity inverting means is so arranged as to invert the polarity of either the input signal to be equalized or the differential signal in order to invert the polarity of the signal component included in distortion detect signal produced at the output of the distortion detect circuit.

4. An automatic equalizer as claimed in claim 1 wherein said tap gain hold circuit includes tap gain memories and a distributor for supplying the correcting signals to the memories, and said polarity inverting means is so arranged as to invert the polarity of the correcting signals supplied from the distributor to the memories in order to invert the polarity of the correcting signals.

5. An automatic equalizer as claimed in claim 1 wherein said polarity inverting means is so arranged as to invert the polarity of the equalized output signal to be supplied to the distortion detect circuit in order to invert the polarity of the signal component included in the distortion detect signal at the output of the distortion detect circuit.

6. An automatic equalizer as claimed in claim 1 wherein the tap gain hold circuit includes a digital memory whose data are corrected by the correcting signals and an add-subtract circuit connected to receive output data from the digital memory and the correct signals for correcting the data stored in the digital memory, and said polarity inverting means is so arranged as to periodically switch between the adding operation and the subtracting operation of the add-subtract circuit in order to invert the polarity of the correct signals.

* * * * *